United States Patent Office 3,755,531
Patented Aug. 28, 1973

3,755,531
PROCESS FOR REFINING ALUMINA
Masahiro Tsukawaki and Yoshiaki Inamoto, Wakayama-shi, Japan, assignors to Kao Soap Co., Ltd., Tokyo, Japan
No Drawing. Filed Aug. 19, 1971, Ser. No. 173,303
Claims priority, application Japan, Aug. 24, 1970, 45/74,013
Int. Cl. C01f 7/06
U.S. Cl. 423—121     4 Claims

ABSTRACT OF THE DISCLOSURE

A crude alkali aluminate solution obtained by extracting aluminum from aluminum-containing ores with caustic alkali solution is added with an emulsion of a polyacrylic acid ester homopolymer or copolymer to precipitate red mud in the solution by flocculaton and to give alkali aluminate solution of good clarity.

BACKGROUND OF THE INVENTION

Field of the invention

This invention relates to a method of the wet process for refining alumina by subjecting aluminum-containing minerals to an alkali treatment. More particularly, it relates to a method for extracting aluminum in the form of alakil aluminates by treating aluminum-containing minerals such as bauxite with a castic alkali solution, in which the process is highly improved by employing an emulsion of a polyacrylic acid ester as a red mud flocculant.

Description of the prior art

In the Bayer process of obtaining alumina from aluminum-containing ore such as bauxite, the alumina component in the ore is dissolved by the use of a highly concentrated solution of an caustic alkali maintained at a high temperature. In the resulting solution there remain undissolved fine particles with red color, which are, because of the color, called "red mud," and mainly consist of the oxides of iron, titanium and silicone as well as other impurities.

The red mud is suspended in the solution in a form of very fine particles and, therefore, it is extremely difficult to separate it from the desired sodium aluminate solution and wash it with water. Because the presence of even a small amount of the red mud gives an undesirable influence on the purity of the resulting alumina product, complete separation of the red mud is of great importance.

Soluble starch has found very wide applications in flocculating and separating the red mud. However, in order to get sufficient settling effects, it is necessary to add a very large amount. Therefore, the excess starch left dissolved in the alkali solution undergoes a chemical degradation owing to the high temperature and high concentration of the alkali solution and the degradation products lead to various processing troubles in the subsquent steps.

Many research works have been made to improve the red mud separation process, and recently some proposals have been made.

The specification of Russian Pat. No. 129,649 discloses the use of a water-soluble polyacrylamide as a flocculant, and the specifications of French Pat. No. 1,357,001 and German Pat. No. 117,762 propose the use of a poly(vinyl-arylsulfonates) such as poly(styrene-sulfonate) and poly (vinyltoluene-sulfonate) as a flocculant. However, the former polymer is deploymerized in the presence of a strong alkali, and, therefore, it cannot retain a high molecular weight necessary for attaining a flocculation effect. Moreover, in the case of the latter as well as the former polymer, a sufficient flocculation effect cannot be attained unless they are used in a very large amount.

Further, Japanese patent publication No. 17893/70 teaches that sodium polyacrylate exhibits a prominent effect on the flocculation of the red mud.

However, it has been found that the use of sodium polyacrylate as a flocculant suffers from the following troubles in processing:

(1) The rate of dissolution of sodium polyacrylate powder into water is not so high. In general, at room temperature, it takes a whole day to obtain an aqueous solution of the polymer having a concentration sufficient to exhibit an effect of sedimenting the red mud, namely 0.1%. The higher is the degree of polymerization, the longer time is required to obtain a solution of the desired concentration. Further, the solubility of the polymer in an alkali solution is generally lower than the solubility in water. In turn, the direct use of the aqueous reaction mixture resulting from the polymerization of sodium acrylate in water is not practicable either, because the reaction mixtures are usually obtained in the form of very tough solid gels which are much more difficult to dissolve than the powdered, dry sodium polyacrylate.

(2) Because the polymer powder is highly hygroscopic, it tends to clog in a feed hopper leading to operational troubles. Further, in order to get a uniform dissolution of the polymer powder, it is necessary to feed the polymer powder in a small quantity at a time so that no undissolved powder lumps will be formed.

(3) The viscosity of the polymer solution is ever decreasing with the passage of the storage period, indicating a lowering of the molecular weight of the polymer. This is very unfavorable because the better flocculation effect is expected with the use of higher molecular weight polymer. Accordingly, the polymer solution once prepared should be used as soon as possible.

(4) It is a general practice for the prepartion of sodium polyacrylate to polymerize sodium acrylate in water. The product of this process is a very tough gel. Isolation of powdered sodium polyacrylate from these gels is a tremendously troublesome process involving cutting the gels into small ribbons, cutting again these ribbons into small dice, then drying these dice into an anhydrous solid, and finally crushing these solids into powder. These processes naturally lead to a high cost of production.

(5) Although sodium polyacrylate is relatively effective for the flocculation of red mud from the bauxite containing a relatively large amount of titanium oxide, its effect is less pronounced for the bauxite containing a relatively large amount of iron oxide as compared to that of titanium oxide.

SUMMARY OF THE INVENTION

Accordingly, an object of this invention is to provide a novel method according to which many of the above difficulties and defects can be overcome.

More specifically, the object of this invention is to provide an improved method in a wet process of refining alumina comprising extracting aluminum in the form of alkali aluminate from aluminum-containing ores by treating the said ores with caustic alkali solution, characterized in that red mud formed in the extraction process is precipitated by flocculation with the use of an emulsion of a polyacrylic acid ester or a copolymer of an acrylic acid ester with comonomers copolymerizable with the acrylic acid ester.

It is preferred that the homopolymer or copolymer of an acrylic acid ester to be used in this invention has an intrinsic viscosity of at least 1.0, especially at least 3.0 as measured in acetone solution at 30° C. The effective homopolymers of acrylic ester to be used in the method of the present invention include any primary alkyl esters of polyacrylic acid which can be hydrolyzed into sodium polyacrylate and the corresponding primary alkanols with caustic alkali solution under the conditions of the alumina-extraction process. Use of lower primary alkyl esters such as methyl, ethyl, propyl, butyl and amyl esters is especially preferred. Higher alkyl esters are less suitable for the present purpose because of the small saponification rate mainly due to low solubilities.

Copolymers of any two or more kinds of acrylic esters as well as copolymers of one or two or more kinds of acrylic ester monomers with any one or two or more kinds of comonomer copolymerizable with the acrylic esters also can be used effectively in the process of the present invention, so long as the content of copolymer components other than acrylic esters in the said copolymers is held within such ranges that will not impair the solubility of the sodium polyacrylate copolymer to be formed on the saponification of the said copolymers in a caustic alkali solution under the conditions of the processing. In general, it is preferred that the copolymer comprises at least 50 mol percent of the acrylic acid ester units. As the comonomer copolymerizable with acrylic acid esters, there may be exemplified methacrylic acid esters, vinyl acetate, acrylonitrile and styrene.

The amount of the polyacrylic acid ester to be added to the processing mixture is 0.005–0.1% by weight based on the weight of dried red mud in the ore. A preferable amount to be added is selected within the above range, changing depending on the composition of the starting ore.

It is certain that the effect of red mud flocculation exhibited by the polyacrylic esters of the present invention is mainly due to that of alkali polyacrylate formed by the saponification of the polyacrylic esters.

In accordance with the above statement, the acrylic ester emulsions of the present invention can be applied to the process by the following two procedures.

(A) Water-dilution method

This method comprises diluting an emulsion of the polyacrylic acid ester with water so that the solids content will be less than 1%, and feeding the diluted emulsion into a red mud sedimentation tank. In case an emulsion having a higher solids content than above is added to the highly concentrated alkali solution of high temperature in the sedimentation tank, clogging of the emulsion will result. It takes about 5–10 minutes from the addition of the emulsion for alkali polyacrylate formed by the saponification of the polyacrylic ester to begin to exhibit the flocculation effect.

(B) Alkali-dilution method

This method comprises adding an emulsion of a polyacrylic acid ester to an aqueous solution of a caustic alkali (usually sodium hydroxide) of a concentration less than about 5% to effect the saponification of the polyacrylic ester before feeding it into a red mud sedimentation tank. In case an aqueous solution of a caustic alkali having a concentration of more than about 5% is used, clogging of the emulsion is caused to result in the formation of polymer lumps which are very difficult to dissolve. In this method, clear dissolution of the emulsion is the measure of the extent of the hydrolysis of the polyacrylic esters, and the hydrolysis of most of homo- and copolymers is accomplished within 15 hours at room temperature and 30 minutes at 90° C. Of course, the flocculation effect is developed immediately after the addition of the above solution to the sedimentation tank.

Special advantages which can be attained by the process of this invention are as follows:

(1) According to the method of the present invention, it takes a very short time for the preparation of the flocculant solution ready to apply to the alumina processing mixtures by using either of the two procedures stated above, while the dissolution of the powdered sodium polyacrylate takes even a whole day. Further, the ease of dissolution is not decreased by increasing the degree of polymerization of the acrylic esters.

(2) Unlike hygroscopic, powdered sodium polyacrylate, the present emulsion flocculants can be handled very easily.

(3) The viscosity of the stock solution of powdered sodium polyacrylate drops according to the period of storage, the drop being larger, the lower the concentration of the solution. It is necessary, therefore, to use the stock solution as soon as possible. No such a drop in the degree of polymerization is found in the case of the present polyacrylic ester emulsion irrespective of the concentration of the emulsion, thus assuring the consistent flocculation performance even after a long period of storage of diluted emulsions prepared according to the above stated Procedure A. Furthermore, the flocculation activity of the alkali solution of hydrolyzed polyacrylic ester does not drop for a long period as found by us.

(4) The ability of a polyacrylic acid ester emulsion for flocculating the red mud, namely the ability of increasing the rate of settling red mud, accelerating the clarification of the aluminate extraction solution and improving the efficiency of the filtration of red mud is comparable or superior to that of powdered sodium polyacrylate.

(5) The ability of a polyacrylic acid ester emulsion for flocculating the red mud is not influenced by the composition of the starting ore but is always excellent regardless of the composition of the starting bauxite ore.

DESCRIPTION OF THE PREFERRED EMBODIMENTS

This invention will be further explained by referring to examples.

Example 1

In a 10 weight percent aqueous solution of sodium hydroxide was suspended 5% of a dry red mud having a composition indicated in Table 1, and the calculated amount of a flocculant was added to the suspension. Then, the red mud settling rate, the clarity of the supernatant liquid and the sedimentation ratio were determined.

Table 1.—Composition of the red mud

| Component: | Content (percent by weight) |
|---|---|
| Alumina | 18.9 |
| Silica | 17.4 |
| Titanium oxide | 2.8 |
| Iron oxide | 39.3 |
| Ignition loss | 10.5 |
| Alkali ($Na_2O$) | 8.3 |

Settling rate

Twenty-three and three quarters ml. of the above suspension was taken into a 30 ml. sedimentation test tube, and 1.25 ml. of an aqueous solution of a flocculant was added thereto. The mixture was agitated in an upside-down manner several times and the test tube was held in the upright position in a bath maintained at 98° C. and the lowering of the red mud level was observed periodically. The constant rate at which the red mud level was lowering was defined as the settling rate.

Clarity

The turbidity of the supernatant liquid was observed by naked eyes at the period of 30 minutes after the completion of the agitation followed by the addition of the flocculant, and the clarity was evaluated on the following scale:

g: good
b: bad
f: intermediate between good and bad

Sedimentation ratio

The sedimentation ratio was expressed in terms of the ratio of the apparent volume of the sedimented red mud in the test tube added with the flocculant to that of the sedimented red mud in a blank test tube after 24 hours.

By our experiment, it was found that the higher is the sedimentation ratio, the easier is the filtration to separate the deposited red mud from the mother liquor.

Results of above tests are shown in Table 2.

present invention does not change appreciably with the storage time, while that of sodium polyacrylate solution drops down to half the original value in a day and to a quarter in two days.

TABLE 2

| Flocculant | Intrinsic viscosity [1] [η] 30° C. dl./g.) | Dose (percent based on red mud) | Settling Rate (ml./min) | Clarity | Sedimentation ratio |
|---|---|---|---|---|---|
| Blank | | | 9.7 | b | 1.00 |
| Polymethyl acrylate emulsion: | | | | | |
| Perpared by water-dilution method (A) [3] | 3.5 | [3] 0.001 | 30 | b | 1.07 |
| Do.[2] | 3.5 | 0.005 | 99 | g | 1.21 |
| Do.[2] | 3.5 | 0.01 | 148 | g | 1.34 |
| Do.[2] | 3.5 | 0.05 | 273 | g | 1.46 |
| Do.[2] | 1.6 | 0.01 | 63 | g | 1.12 |
| Do.[2] | 7.4 | 0.01 | 286 | g | 1.47 |
| Prepared by alkali-dilution method (B) (100° C.) [4] | 3.5 | 0.001 | 62 | f | 1.11 |
| Do.[4] | 3.5 | 0.01 | 260 | g | 1.44 |
| Do.[4] | 1.6 | 0.01 | 71 | g | 1.15 |
| Do.[4] | 7.4 | 0.01 | 294 | g | 1.49 |
| Prepared by alkali-dilution method (B) (room temperature) [5] | 3.5 | 0.01 | 264 | g | 1.43 |
| Acrylic acid ester copolymer emulsion: | | | | | |
| Methyl acrylate/methyl methacrylate copolymer (60/40) prepared by water-dilution method (A) [2] | 4.1 | 0.01 | 132 | g | 1.30 |
| Methyl acrylate/styrene copolymer (80/20) prepared by water-dulution method (A) [2] | 3.8 | 0.01 | 115 | g | 1.28 |
| Comparison: | | | | | |
| Sodium polyacrylate [6] | 3.9 | 0.01 | 77 | f | 1.20 |
| Do.[6] | 5.6 | 0.01 | 120 | g | 1.28 |
| Do.[6] | 9.8 | 0.01 | 215 | g | 1.42 |
| Do.[6] | 6.8 | 0.001 | 43 | b | 1.07 |
| Do.[6] | 6.8 | 0.01 | 161 | g | 1.36 |
| Do.[6] | 6.8 | 0.05 | 265 | g | 1.44 |
| Wheat starch | | 0.01 | 42 | f | 1.16 |

[1] Solvent for viscosity measurements: Acetone for polymethylacrylate and the copolymers of methyl acrylate, and 2N-NaOH aqueous solution for powdered sodium polyacrylate. Polymethyl acrylate having an intrinsic viscosity [η] of 3.5 in acetone at 30° C. gave, after saponification, sodium polyacrylate having an intrinsic viscosity of 5.5 in 2 N sodium hydroxide solution at 30° C.
[2] After the addition of the flocculant solution, the mixture was allowed to stand for 10 minutes in a bath maintained at 98° C. and shaken upside down several times. Then, the settling rate was measured.
[3] Amount added was calsulated as sodium polyacrylate to be formed.
[4] Prepared according to Method B. The polymethyl acrylate emulsion was mixed with 4% sodium hydroxide solution to give a polymer concentration of 0.01%, the mixture being heated for 5 minutes at 100° C. to effect the complete solution.
[5] Prepared according to Method A. The polymethyl acrylate emulsion was mixed with 4% sodium hydroxide solution to give a polymer concentration of 0.01%, the mixture being stirred for 24 hours at room temperature to give a clear solution.
[6] Solution prepared by dissolving the powdered sodium polyacrylate in pure water with stirring at room temperature for 24 hours (polymer concentration=0.1%).

As shown in Table 2, the flocculation effects of polyacrylic ester emulsion of the present invention, as judged from the value of settling rates, clarities, and sedimentation ratios, are comparable or superior to those of powdered sodium polyacrylate, and much more excellent than those of wheat starch.

EXAMPLE 2

In order to compare the storage stability of the emulsion flocculant used in the present invention to that of the powdered sodium polyacrylate, stock solutions of each flocculant was prepared as follows.

(1) Emulsion flocculant of the present invention:
an emulsion of polymethyl acrylate was diluted with water to give an emulsion of the concentration of 0.01%.
(2) Powdered solium polyacrylate; the powder was dissolved in water in the concentration of 0.01%.

Each stock solution was stored at room temperature and tested on their flocculation property during the period of 6 days, the measurement being made every day. The method of testing was as follows. A 5% suspension of the red mud cited in Table 1 in 10% aqueous sodium hydroxide solution was maintained at 98° C. The amount of each stock solution equal to that of the red mud contained in the test suspension prepared above was added to the suspension. The mixture was kept at 98° C. for 10 minutes, then shaken in upside-down manner several times and set aside. The results of the measurements of the settling rate are shown in Table 3, which clearly indicates that the flocculation property of the emulsion of the

TABLE 3

[Change in settling rate (ml./min.) of the stock solutions]

| Storage time (days) | 0.01% polymethylacrylate aqueous emulsion | 0.01% aqueous solution of sodium polyacrylate |
|---|---|---|
| 0 | 148 | 110 |
| 1 | 147 | 64 |
| 2 | 149 | 28 |
| 3 | 146 | 24 |
| 4 | 150 | 25 |
| 5 | 146 | 25 |
| 6 | 144 | 25 |

EXAMPLE 3

A mixture of 140 g. of the bauxite of the composition shown in Table 4 and 1140 g. of 14% sodium hydroxide solution (concentration=160 grams per liter) was heated with stirring at 150° C. for 1 hour in an autoclave.

TABLE 4

[Composition of bauxite specimens]

| Component | Content (percent by weight) | |
|---|---|---|
| | Specimen A | Specimen B |
| Silica | 3.82 | 3.77 |
| Iron oxide | 15.09 | 8.80 |
| Titanium oxide | 2.66 | 8.17 |
| Alumina | 47.51 | 52.59 |
| Ignition loss | 28.66 | 26.61 |
| Total | 97.74 | 99.94 |

Aliquot of the resulting digested bauxite solution was taken out, to which was added the calculated amount of the flocculant, the settling rates being determined in the same way as in Example 1. The ratio of the settling rate in the mixture containing a flocculant to that of the blank sample (containing no flocculant) was then calculated, which is shown in Table 5.

TABLE 5

[Settling rate ratio]

| Bauxite specimen | Polymethyl acrylate emulsion [1] | | Sodium polyacrylate | |
|---|---|---|---|---|
| | 4 p.p.m./ slurry | 20 p.p.m./ slurry | 4 p.p.m./ slurry | 20 p.p.m./ slurry |
| A | 11 | 204 | 1.8 | 1.5 |
| B | 90 | 211 | 3.7 | 85 |

[1] Applied after saponification according to Alkali-Dilution Method (II) (using 4% sodium hydroxide solution at room temperature for 24 hrs.).

As shown in above Tables 4 and 5, powdered sodium polyacrylate is effective for flocculating the red mud from Specimen B, but it is not effective for flocculating the red mud from Specimen A. On the other hand, the polymethyl acrylate emulsion is effective both for Specimen A and Specimen B. Thus, the polyacrylate ester emulsion of the present invention, the performance of which is less affected by the origin of bauxite ore, has wider applicability than powdered sodium polyacrylate.

What we claim is:

1. In a process for refining alumina comprising extracting aluminum in the form of an alkali aluminate from an aluminum-containing ore by treating the ore with caustic alkali solution, and separating the red mud from the processing mixture to give alkali aluminate solution of good clarity, the improvement which comprises effecting the separation by adding to the processing mixture an emulsion in water of polymer selected from the group consisting of homopolymers of lower primary alkyl acrylate monomers, copolymers of two or more kinds of lower primary alkyl acrylate monomers, and copolymers of one or more kinds of lower primary alkyl acrylate monomers with one or more kinds of comonomers copolymerizable with said lower primary alkyl acrylate monomers, said polymer having an intrinsic viscosity, measured in acetone at 30° C., of at least 1.0, the amount of said polymer, calculated as the solids, being in the range of 0.005 to 0.1% by weight, based on the weight of dry red mud in the processing mixture, said polymer containing at least 50 mol percent of lower primary alkyl acrylate monomer units, and said lower primary alkyl acrylate monomers being selected from the group consisting of methyl, ethyl, propyl, butyl and amyl acrylates.

2. The process as claimed in claim 1, in which said homopolymer or copolymer of lower primary alkyl acrylate has an intrinsic viscosity of at least 3.0.

3. The process as claimed in claim 1, in which said emulsion in water of said polymer is diluted with water so that the solids content will be less than 1% and adding the diluted emulsion into the processing mixture.

4. The process as claimed in claim 1, in which said emulsion in water of said polymer is added to an aqueous solution of a caustic alkali of a concentration less than about 5% to effect the saponification of the polyacrylic ester before adding the emulsion to the processing mixture.

References Cited

UNITED STATES PATENTS

| | | | |
|---|---|---|---|
| 3,390,959 | 7/1968 | Sibert | 23—52 X |
| 3,023,162 | 2/1962 | Fordyce et al. | 23—143 UX |
| 3,445,187 | 5/1969 | Sibert | 23—143 |
| 3,397,953 | 8/1968 | Galvin et al. | 23—52 UX |

HERBERT T. CARTER, Primary Examiner

U.S. Cl. X.R.

423—111; 625; 209—5